United States Patent
Sekine et al.

(10) Patent No.: US 10,752,773 B2
(45) Date of Patent: Aug. 25, 2020

(54) FIBER-REINFORCED RESIN COMPOSITE MATERIAL AND METHOD FOR PRODUCING SAME

(71) Applicants: SUBARU CORPORATION, Tokyo (JP); JX NIPPON OIL & ENERGY CORPORATION, Tokyo (JP)

(72) Inventors: Naoyuki Sekine, Tokyo (JP); Eikatsu Yamaguchi, Tokyo (JP); Yoshihiro Fukuda, Tokyo (JP); Hiroyasu Ihara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/951,864

(22) Filed: Apr. 12, 2018

(65) Prior Publication Data
US 2018/0230306 A1 Aug. 16, 2018

Related U.S. Application Data

(62) Division of application No. 14/348,423, filed as application No. PCT/JP2011/072628 on Sep. 30, 2011, now abandoned.

(51) Int. Cl.
*C08L 79/04* (2006.01)
*B32B 5/22* (2006.01)
(Continued)

(52) U.S. Cl.
CPC ............ *C08L 79/04* (2013.01); *B29C 64/106* (2017.08); *B29C 70/46* (2013.01); *B29C 70/48* (2013.01);
(Continued)

(58) Field of Classification Search
CPC ........ C08L 79/04; C08L 63/00; B29C 64/106; B29C 70/46; B29C 70/48; B29D 99/0014;
(Continued)

(56) References Cited

U.S. PATENT DOCUMENTS 5,567,499 A * 10/1996 Cundiff ................. B29C 70/086
428/116
7,709,579 B2 * 5/2010 Lehmann ............... C08G 12/08
264/299

FOREIGN PATENT DOCUMENTS

EP 0749825 A2 12/1996
EP 1216816 A1 6/2002
(Continued)

OTHER PUBLICATIONS

Kuroki et al., JP 2007-016121 a machine translation in English, Jan. 25, 2007 (Year: 2007).*
(Continued)

*Primary Examiner* — David T Karst
(74) *Attorney, Agent, or Firm* — McDermott Will & Emery LLP

(57) ABSTRACT

The purpose of the present invention is to inhibit a decrease in strength attribute to the interface between a simple-shape portion and a complicated-shape portion. This fiber-reinforced resin composite material comprises: a simple-shape portion formed from at least one sheet-shaped prepreg material obtained by impregnating reinforcing fibers with a resin; and a complicated-shape portion obtained by impregnating reinforcing fibers with a resin, the complicated-shape portion having been integrated with the simple-shape portion. The resin used for the prepreg material comprised the same components as the resin used for the complicated-shape portion.

5 Claims, 5 Drawing Sheets

(51) Int. Cl.
  *B32B 5/24* (2006.01)
  *B32B 5/26* (2006.01)
  *B32B 5/28* (2006.01)
  *B32B 27/04* (2006.01)
  *B32B 27/12* (2006.01)
  *B32B 27/28* (2006.01)
  *B32B 3/02* (2006.01)
  *C08J 5/24* (2006.01)
  *C08L 63/00* (2006.01)
  *B29C 70/46* (2006.01)
  *B29C 70/48* (2006.01)
  *B29D 99/00* (2010.01)
  *B29C 64/106* (2017.01)

(52) U.S. Cl.
  CPC ............ *B29D 99/0014* (2013.01); *B32B 3/02* (2013.01); *B32B 5/22* (2013.01); *B32B 5/24* (2013.01); *B32B 5/26* (2013.01); *B32B 5/28* (2013.01); *B32B 27/04* (2013.01); *B32B 27/12* (2013.01); *B32B 27/28* (2013.01); *C08J 5/24* (2013.01); *C08L 63/00* (2013.01); *B32B 2250/02* (2013.01); *B32B 2250/20* (2013.01); *B32B 2250/40* (2013.01); *B32B 2260/021* (2013.01); *B32B 2260/023* (2013.01); *B32B 2260/046* (2013.01); *B32B 2605/00* (2013.01); *B32B 2605/08* (2013.01); *B32B 2605/10* (2013.01); *B32B 2605/12* (2013.01); *B32B 2605/18* (2013.01); *C08J 2363/00* (2013.01)

(58) Field of Classification Search
  CPC .... B32B 3/02; B32B 5/22; B32B 5/24; B32B 5/26; B32B 5/28; B32B 27/04; B32B 27/12; B32B 27/28; B32B 2250/02; B32B 2250/20; B32B 2250/40; B32B 2260/021; B32B 2260/023; B32B 2260/046; B32B 2605/00; B32B 2605/08; B32B 2605/10; B32B 2605/12; B32B 2605/18; C08J 5/24; C08J 2363/00
  USPC ....................................................... 523/400
  See application file for complete search history.

(56) References Cited

FOREIGN PATENT DOCUMENTS

| | | |
|---|---|---|
| JP | 05-058730 A | 3/1993 |
| JP | 10-128860 A | 5/1998 |
| JP | 2003-147165 A | 5/2003 |
| JP | 2007-016121 A | 1/2007 |
| JP | 2007016121 A * | 1/2007 ............... C08J 5/24 |
| JP | 2010-509446 A | 3/2010 |
| JP | 2010-076356 A | 4/2010 |
| WO | 2008/060545 A1 | 5/2008 |
| WO | 2010/092723 A1 | 8/2010 |

OTHER PUBLICATIONS

International Search Report, w/ English translation thereof, issued in International Application No. PCT/JP2011/072628 dated Nov. 1, 2011.
Kashiwagi et al., "Evaluation of Interlaminar Properties of VaRTM and Prepreg Hybrid CFRP laminates," Proceedings of 1st Joint Conference of Composite Materials in Japan, The Society of Materials Science, Japan, and Japan Society for Composite Materials, Mar. 2010, p. 426-429.
International Preliminary Report on Patentability and Written Opinion issued in International Application No. PCT/JP2011/072628 dated Apr. 1, 2014, with English translation.
Extended European Search Report EP Application No. 11872920.1 dated Apr. 28, 2015.
Database WPI Week 199830, May 19, 1998, Thomson Scientific, London GB; AN 1998-342046 XP002738309 & jp h10 128860 A (Honda Motor Co., Ltd.), Abstract.
Database WPI, Week 199315, Mar. 9, 1993, Thomson Scientific, London, GB; AN 1993-121141, XP002738310 & JP H05 58730 A (Kawasaki Heavy Ind., Ltd.) * Abstract.
Database WPI Week 200726, Jan. 25, 2007, Thomson Scientific, London GB; AN 2007-260717 XP002738311, & JP 2007 016121 A (Toray Ind., Inc.), * Abstract.
Notification of First Office Action Chinese Patent Application No. 2011800737370 dated Sep. 29, 2015 with full English translation.
Notice of Final Rejection of Korean Patent Application No. 10-2014-7005872 dated Dec. 28, 2015 with English translation.
Notification of Second Office Action Chinese Patent Application No. 2011800737370 dated Jun. 20, 2016 with full English translation.
Office Action issued in related European Patent Application No. 11872920.1 dated Sep. 8, 2016.
Non-Final Office Action issued in related parent U.S. Appl. No. 14/348,423, dated May 1, 2017.
Final Office Action issued in related parent U.S. Appl. No. 14/348,423, dated Nov. 16, 2017.

* cited by examiner

FIBER-REINFORCED RESIN COMPOSITE MATERIAL AND METHOD FOR PRODUCING SAME

CROSS RELATED APPLICATIONS

This application is a Divisional of U.S. patent application Ser. No. 14/348,423, filed on Mar. 28, 2014, which is an U.S. National Phase under 35 U.S.C. § 371 of International Application No. PCT/JP2011/072628, filed on Sep. 30, 2011, the disclosures of which are incorporated herein in their entirety by reference.

TECHNICAL FIELD

The present invention relates to a fiber-reinforced resin composite material and a method for producing the same, and specifically, relates to a fiber-reinforced resin composite material used for structural members of aircrafts, land vehicles, watercrafts and the like and a method for producing the same.

BACKGROUND ART

A fiber-reinforced resin composite material (FRP: Fiber Reinforced Plastics) has been widely used as a fiber-reinforced resin composite material used for structural members of aircrafts, land vehicles, watercrafts and the like. Such a fiber-reinforced resin composite material include, as a simple-shape portion, an outer panel formed of a sheet(s) of a prepreg material(s) formed of a carbon fiber(s) impregnated with a resin(s), and as a complex-shape portion, a reinforcing portion formed of a fiber-reinforced resin(s) such as a beam (girder), rib, longeron and the like or a supporting member formed of a fiber-reinforced resin(s) such as a bracket or both, which reinforcing portion and supporting member are integrally provided on the interior side of the outer panel.

To efficiently integrate such a simple-shape portion and complex-shape portion, a technique to form a fiber-reinforced resin composite material by Vacuum-assisted Resin Transfer Molding (VaRTM) has been developed in recent years (see Non-Patent Document 1, for example).

PRIOR ART DOCUMENT

Non-Patent Document

Non-patent document 1: Shunsuke Kashiwagi, "Hybrid Seikei CFRP no Soukan Tokusei Hyouka (Evaluation of Interlaminar Properties of CFRP formed by Hybrid Molding)", Proceeding of 1st Joint Conference of Composite Materials in Japan, the Society of Materials Science, Japan, and Japan Society for Composite Materials, March 2010, p. 426-429

SUMMARY OF THE INVENTION

Problem to be Solved by the Invention

When a fiber-reinforced resin composite material is formed by the above method, a phase boundary is then formed at the joint face of a simple-shape portion and a complex-shape portion. When such a phase boundary is formed, the phase boundary may decrease the strength of a fiber-reinforced resin composite material.

Thus, an object is the present invention is to suppress such a decrease in the strength due to the presence of a phase boundary of a simple-shape portion and a complex-shape portion.

Means for Solving Problem

According to a first aspect of the present invention, there is provided is a fiber-reinforced resin composite material, including:

a simple-shape portion formed of at least one sheet of a prepreg material composed of a reinforcing fiber impregnated with a resin; and a complex-shape portion formed of a reinforcing fiber impregnated with a resin, the complex-shape portion being integrally formed with the simple-shape portion, wherein the resin used in the prepreg material and the resin used in the complex-shape portion include a same component(s).

In the above fiber-reinforced resin composite material, it is preferable that the resin used in the prepreg material and the resin used in the complex-shape portion are a benzoxazine resin composition.

In the above fiber-reinforced resin composite material, it is preferable that the benzoxazine resin composition includes a compound containing in its molecule a benzoxazine ring represented by a formula (1), an epoxy resin, a curing agent and a toughness enhancing agent:

[Chemical Formula 1]

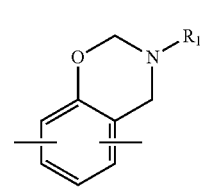

(1)

wherein $R_1$ represents a chain alkyl group of 1 to 12 carbons, a ring alkyl group of 3 to 8 carbons, a phenyl group or a phenyl group substituted with a chain alkyl group of 1 to 12 carbons or a halogen; and a hydrogen atom is bonded to at least one of carbon atoms at an ortho position and a para position of a carbon atom that bonds the oxygen atom of the aromatic ring in the formula.

According to a second aspect of the present invention, there is provided a method for producing a fiber-reinforced resin composite material, the method including:

forming a simple-shape portion from at least one sheet of a prepreg material formed of a reinforcing fiber impregnated with a resin; and forming a complex-shape portion integrally with the simple-shape portion, the complex-shape portion being formed of a reinforcing fiber impregnated with a resin, wherein the resin used in the prepreg material and the resin used in the complex-shape portion include a same component(s).

In the above method for producing the fiber-reinforced resin composite material, it is preferable that the resin used in the prepreg material and the resin used in the complex-shape portion are a benzoxazine resin composition.

In the above method for producing the fiber-reinforced resin composite material, it is preferable that the benzoxazine resin composition includes a compound containing in its molecule a benzoxazine ring represented by a formula (1), an epoxy resin, a curing agent and a toughness enhancing agent:

[Chemical Formula 2]

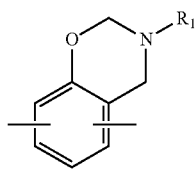

(1)

wherein $R_1$ represents a chain alkyl group of 1 to 12 carbons, a ring alkyl group of 3 to 8 carbons, a phenyl group or a phenyl group substituted with a chain alkyl group of 1 to 12 carbons or a halogen; and a hydrogen atom is bonded to at least one of carbon atoms at an ortho position and a para position of a carbon atom that bonds the oxygen atom of the aromatic ring in the formula.

Effect of the Invention

The inventors have focused attention on the fact that properties required for a resin conventionally used in a prepreg and properties required for a resin conventionally used in a complex-shape portion (resins for RTM) are different, and when the component(s) of a resin used in a simple-shape portion differ from the component(s) of a resin used in a complex-shape portion, a phase boundary is formed at their joint face in the case of using that prior art, i.e., Vacuum-assisted Resin Transfer Molding. The present inventors then have revealed that when a resin used in a simple-shape portion and a resin used in a complex-shape portion include (or are composed of) the same component(s), a phase boundary is not formed at their joint face after the integration and thus the decrease in strength can be suppressed. Hence, according to the present invention, it is able to suppress the decrease in strength caused due to a phase boundary of a simple-shape portion and a complex-shape portion.

DESCRIPTION

Preferred embodiments for carrying out the present invention will now be described with reference to the drawings. The following embodiments include various specifications that are technically preferable for carrying out the present invention, but it is not intended to restrict the scope of the present invention to the following embodiments and illustrations.

Figure 1:
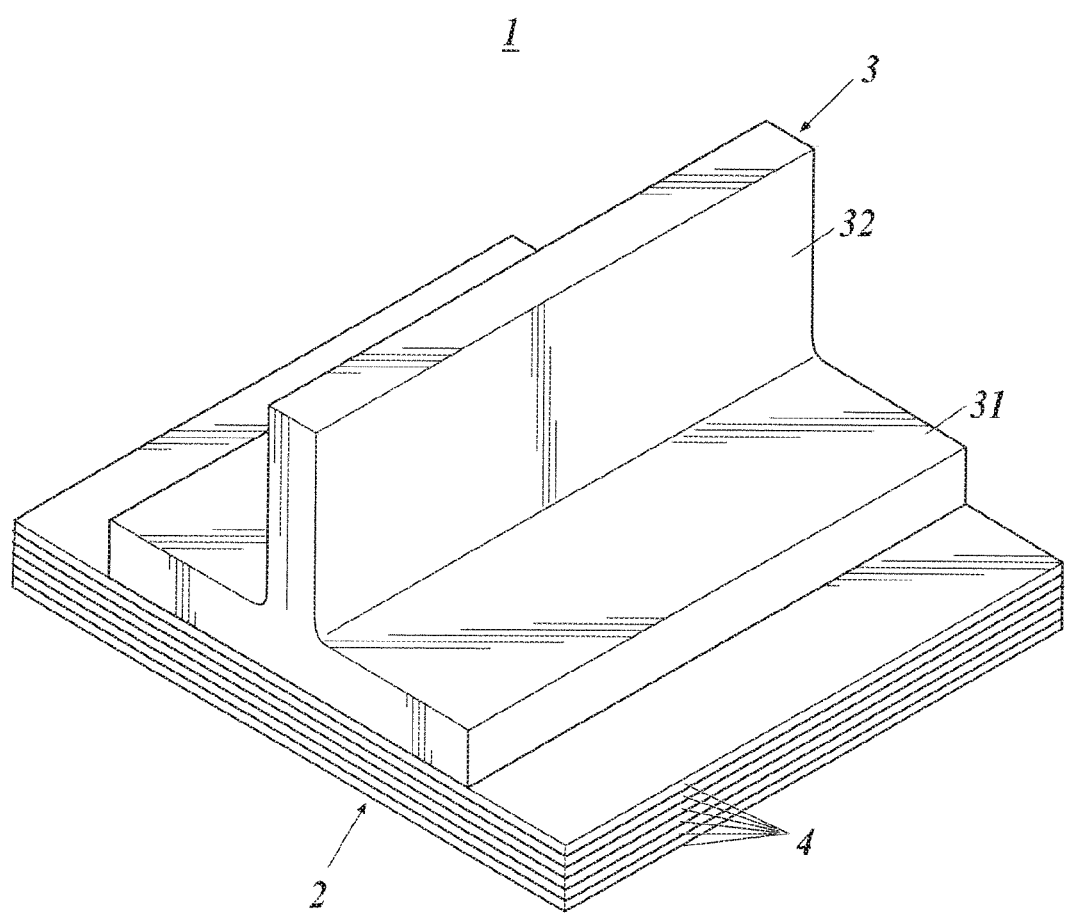
FIG. 1 This is a schematic perspective view illustrating a schematic configuration of a fiber-reinforced resin composite material according to an embodiment of the present invention.

FIG. 1 is a schematic perspective view illustrating a schematic configuration of a fiber-reinforced resin composite material according to an embodiment of the present invention. As illustrated in FIG. 1, a fiber-reinforced resin composite material 1 includes an outer panel 2 as a simple-shape portion and a reinforcing portion 3 as a complex-shape portion monolithically integrated with the outer panel 2.

The outer panel 2 is formed by laminating multiple sheets of a prepreg material 4. The prepreg material 4 is formed by impregnating a reinforcing fiber with a resin.

The reinforcing portion 3 includes a base portion 31 which is to be fixed on the outer panel 2 and a rib 32 which rises up from the middle of the base portion 31. Similar to the above, the reinforcing portion 3 is formed by impregnating a reinforced fiber with a resin. The resin used in the prepreg material 4 constituting the outer panel 2 and the resin used in the reinforcing portion 3 are composed of the same component(s).

The resin used in the prepreg material 4 and the reinforcing portion 3 will be now described.

This resin is a benzoxazine resin composition that contains a compound (A) containing in its molecule a benzoxazine ring(s) represented by the formula (1); an epoxy resin (B); a curing agent (C); and a toughness enhancing agent (D).

The compound (A) is a benzoxazine resin represented by the formula (1). In the formula (1), $R_1$ represents a chain alkyl group of 1 to 12 carbons, a ring alkyl group of 3 to 8 carbons, a phenyl group, or a phenyl group substituted with a halogen(s) or a chain alkyl group(s) of 1 to 12 carbons.

Examples of the chain alkyl group of 1 to 12 carbons include methyl group, ethyl group, propyl group, isopropyl group, n-butyl group, isobutyl group and t-butyl group.

Examples of the ring alkyl group of 3 to 8 carbons include cyclopentyl group and cyclohexyl group.

Examples of the phenyl group substituted with a halogen(s) or a chain alkyl group(s) of 1 to 12 carbons include phenyl group, o-methyl phenyl group, m-methyl phenyl group, p-methyl phenyl group, o-ethyl phenyl group, m-ethyl phenyl group, p-ethyl phenyl group, o-t-butyl phenyl group, m-t-butyl phenyl group, p-t-butyl phenyl group, o-chloro phenyl group and o-bromo phenyl group.

Among the above examples, $R_1$ is preferably methyl group, ethyl group, propyl group, phenyl group or o-methyl phenyl group because these groups provide good handleability.

Preferable examples of the benzoxazine resin that is the compound (A) include monomers represented by the following formulae, oligomers of several molecules of any of these monomers, reactants of a compound(s) containing a benzoxazine ring(s) whose structures are different from those of these monomers with at least one of these monomers.
[Chemical Formula 3]
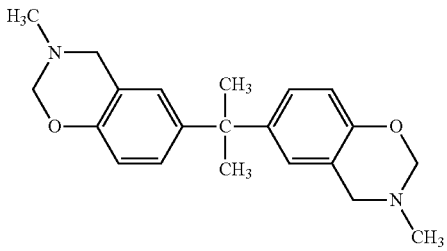
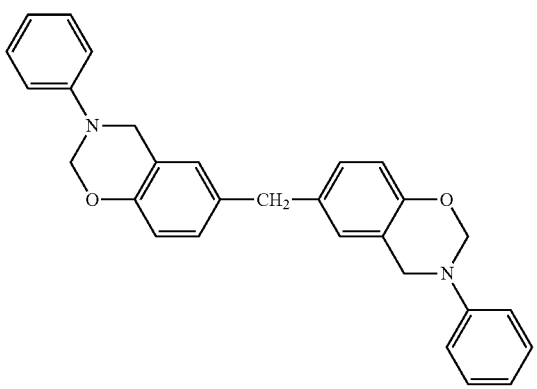
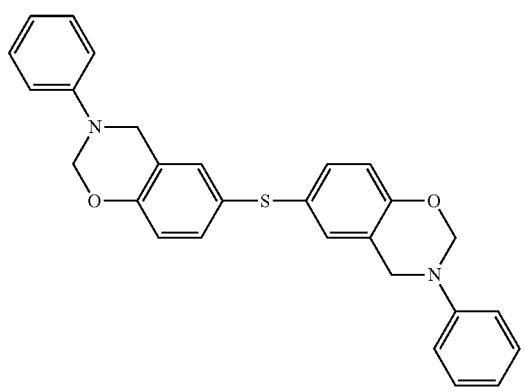
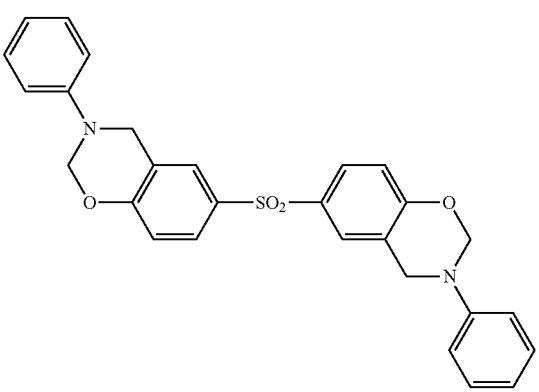
[Chemical Formula 4]

-continued

[Chemical Formula 5]

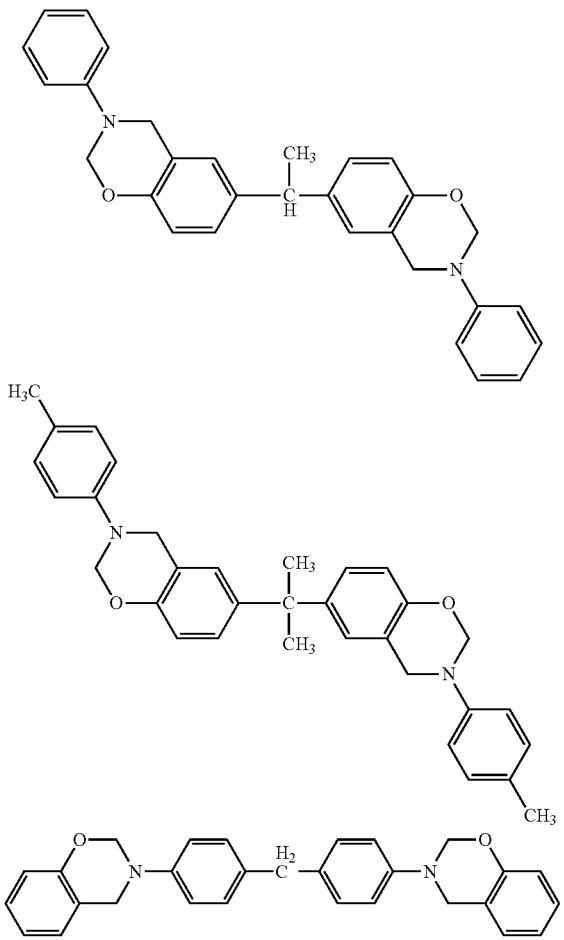

The compound (A) is excellent in fire retardancy because the compound (A) contains a skeleton similar to that of a phenol resin, which skeleton is obtained by ring-opening polymerization of benzoxazine rings. Further, the compound (A) provides excellent mechanical properties such as low water absorption and high elastic modulus because the compound (A) has a dense structure.

The epoxy resin (B) is a component that controls viscosity of a composition and enhances curability of a composition. Preferable examples of the epoxy resin (B) include epoxy resins whose precursors are, for example, amines, phenols, carboxylic acids and unsaturated carbons.

Examples of epoxy resins whose precursors are amines include tetraglycidylaminodiphenylmethane, glycidyl compounds of xylenediamine, triglycidylaminophenol, regioisomers of glycidylaniline and glycidylaniline substituted with an alkyl group(s) or a halogen(s) or both.

Commercially available liquid products below are described with their viscosities each of which is the product's complex viscoelastic modulus η* at 25° C. obtained using a dynamic viscoelasticity measuring device described later.

Examples of commercially available products of tetraglycidylaminodiphenylmethane include SUMI-EPDXY (registered trademark, hereinafter the same shall apply in this) ELM434 (manufactured by Sumitomo Chemical Co., Ltd.); Araldite (registered trademark, hereinafter the same shall apply in this) MY720, Araldite MY 721, Araldite MY9512, Araldite MY9612, Araldite MY9634 and Araldite MY9663 (manufactured by Huntsman Advanced Materials); and jER (registered trademark, hereinafter the same shall apply in this) 604 (manufactured by Mitsubishi Chemical Corporation).

Examples of commercially available products of triglycidylaminophenol include jER 630 (viscosity: 750 mPa·s) (manufactured by Mitsubishi Chemical Corporation); Araldite MY0500 (viscosity: 3500 mPa·s) and MY0510 (viscosity: 600 mPa·s) (manufactured by Huntsman Advanced Materials); and ELM100 (viscosity: 16000 mPa·s) (manufactured by Sumitomo Chemical Co., Ltd.).

Examples of commercially available products of glycidylanilines include GAN (viscosity: 120 mPa·s) and GOT (viscosity: 60 mPa·s) (manufactured by NIPPON KAYAKU Co., Ltd.).

Examples of glycidyl ether epoxy resins whose precursors are phenols include bisphenol A epoxy resins, bisphenol F epoxy resins, bisphenol S epoxy resins, epoxy resins containing biphenyl skeletons, phenol novolac epoxy resins, cresol novolac epoxy resins, resorcinol epoxy resins, epoxy resins containing naphthalene skeletons, trisphenylmethane epoxy resins, phenol aralkyl epoxy resins, dicyclopentadiene epoxy resins, diphenylfluorene epoxy resins, various isomers of them and alkyl- or halogen-substituted derivatives of them.

In addition, urethane- and isocyanate-modified epoxy resins whose precursors are phenols are also examples of glycidyl ether epoxy resins.

Examples of commercially available products of liquid bisphenol A epoxy resins include jER 825 (viscosity: 5000 mPa·s), jER 826 (viscosity: 8000 mPa·s), jER 827 (viscosity: 10000 mPa·s) and jER 828 (viscosity: 13000 mPa·s) (manufactured by Mitsubishi Chemical Corporation); EPICLON (registered trademark, hereinafter the same shall apply in this) 850 (viscosity: 13000 mPa·s) (manufactured by DIC Corporation); EPOTOHTO (registered trademark, hereinafter the same shall apply in this) YD-128 (viscosity: 13000 mPa·s) (manufactured by Nippon Steel Chemical Co., Ltd.); and DER-331 (viscosity: 13000 mPa·s) and DER-332 (viscosity: 5000 mPa·s) (manufactured by The Dow Chemical Co.).

Examples of commercially available products of solid or semisolid bisphenol A epoxy resins include jER 834, jER 1001, jER 1002, jER 1003, jER 1004, jER 1004AF, jER 1007 and jER 1009 (manufactured by Mitsubishi Chemical Corporation).

Examples of commercially available products of liquid bisphenol F epoxy resins include jER 806 (viscosity: 2000 mPa·s), jER 807 (viscosity: 3500 mPa·s), jER 1750 (viscosity: 1300 mPa·s), jER (manufactured by Mitsubishi Chemical Corporation); EPICLON 830 (viscosity: 3500 mPa·s) (manufactured by DIC Corporation); and EPOTOHTO YD-170 (viscosity: 3500 mPa·s) and EPOTOHTO YD-175 (viscosity: 3500 mPa·s) (manufactured by Nippon Steel Chemical Co., Ltd.).

Examples of commercially available products of solid bisphenol F epoxy resins include 4004P, jER 4007P and jER 4009P (manufactured by Mitsubishi Chemical Corporation); and EPOTOHTO YDF2001 and EPOTOHTO YDF2004 (manufactured by Nippon Steel Chemical Co., Ltd.).

Examples of bisphenol S epoxy resins include EXA-1515 (manufactured by DIC Corporation).

Examples of commercially available products of epoxy resins containing biphenyl skeletons include jER YX4000H, jER YX4000 and jER YL6616 (manufactured by Mitsubishi Chemical Corporation); and NC-3000 (manufactured by NIPPON KAYAKU Co., Ltd.).

Examples of commercially available products of phenol novolac epoxy resins include jER 152 and jER 154 (manufactured by Mitsubishi Chemical Corporation); and EPICLON N-740, EPICLON N-770 and EPICLON N-775 (manufactured by DIC Corporation).

Examples of commercially available products of cresol novolac epoxy resins include EPICLON N-660, EPICLON N-665, EPICLON N-670, EPICLON N-673 and EPICLON N-695 (manufactured by DIC Corporation); and EOCN-1020, EOCN-1025 and EOCN-1045 (manufactured by NIPPON KAYAKU Co., Ltd.).

Examples of commercially available products of resorcinol epoxy resins include DENACOL (registered trademark, hereinafter the same shall apply in this) EX-201 (viscosity: 250 mPa·s) (manufactured by Nagase ChemteX Corporation).

Examples of commercially available products of epoxy resins containing naphthalene skeletons include EPICLON HP4032 (manufactured by DIC Corporation); and NC-7000 and NC-7300 (manufactured by NIPPON KAYAKU Co., Ltd.).

Examples of commercially available products of trisphenylmethane epoxy resins include TMH-574 (manufactured by Sumitomo Chemical Co., Ltd.).

Examples of commercially available products of dicyclopentadiene epoxy resins include EPICLON HP7200, EPICLON HP7200L and EPICLON HP7200H (manufactured by DIC Corporation); Tactix (registered trademark) 558 (manufactured by Huntsman Advanced Materials); and XD-1000-1L and XD-1000-2L (manufactured by NIPPON KAYAKU Co., Ltd.).

Examples of commercially available products of urethane- and isocyanate-modified epoxy resins include AER4152 which contains oxazolidone ring (manufactured by Asahi Kasei E-materials Corporation).

Examples of epoxy resins whose precursors are carboxylic acids include glycidyl compounds of phthalic acid, glycidyl compounds of hexahydro phthalic acid, glycidyl esters of dimer acids and their isomers.

Examples of commercially available products of diglycidyl phthalates include EPOMIK (registered trademark, hereinafter the same shall apply in this) R508 (viscosity: 4000 mPa·s) (manufactured by Mitsui Chemical Corporation); and DENACOL EX-721 (viscosity: 980 mPa·s) (manufactured by Nagase ChemteX Corporation).

Examples of commercially available products of diglycidyl phthalates include EPOMIK R540 (viscosity: 350 mPa·s) (manufactured by Mitsui Chemical Corporation); and AK-601 (viscosity: 300 mPa·s) (NIPPON KAYAKU CO., Ltd.).

Examples of commercially available products of diglycidyl esters of dimer acids include jER 871 (viscosity: 650 mPa·s) (manufactured by Mitsubishi Chemical Corporation); and EPOTOHTO YD-171 (viscosity: 650 mPa·s) (manufactured by Nippon Steel Chemical Co., Ltd.).

Examples of epoxy resins whose precursors are unsaturated carbons include alicyclic epoxy resins; namely, as commercially available products of (3',4'-epoxycyclohexane) methyl-3,4-epoxycyclohexanecarboxylate, CELLOXIDE (registered trademark, hereinafter the same shall apply in this) 2021P (viscosity: 250 mPa·s) (manufactured by DAICEL CORPORATION) and CY179 (viscosity: 400 mPa·s) (manufactured by Huntsman Advanced Materials); as a commercially available product of (3',4'-epoxycyclohexane)octyl-3,4-epoxycyclohexanecarboxylate, CELLOXIDE 2081 (viscosity: 100 mPa·s) (manufactured by DAICEL CORPORATION); and as a commercially available product of 1-methyl-4-(2-methyloxyranyl)-7-oxabicyclo[4.1.0]heptane, CELLOXIDE 3000 (viscosity: 20 mPa·s) (manufactured by DAICEL CHEMICAL INDUSTRIES, LTD.).

The epoxy resin (B) is contained preferably 10 to 100 parts by mass, and more preferably 10 to 60 parts by mass per 100 parts by mass of the compound (A) which is a benzoxazine resin. It is better that the viscosity at 25° C. of the epoxy resin that is liquid at 25° C. is lower in terms of tackiness and drapeability. The viscosity is preferably 5 m·Pa or more and 20000 m·Pa or less; 5 m·Pa is the minimum in commercially available products of epoxy resins. More preferably, the viscosity is 5 m·Pa or more and 15000 m·Pa or less. When the viscosity is over 20000 m·Pa, tackiness and drapeability may decrease.

As the epoxy resins that are solid at 25° C., epoxy resins having a high content of an aromatic compound(s) are preferable for increasing fire retardancy. For example, epoxy resins containing biphenyl skeletons, epoxy resins containing naphthalene skeletons and phenol aralkyl resins are given as examples.

Preferable examples of the curing agent (C) include one of, or a mixture of two or more of the followings: aromatic amines such as diethyltoluenediamine, metaphenylenediamine, diaminodiphenylmethane, diaminodiphenylsulfone, metaxylenediamine and derivatives of them; aliphatic amines such as triethylenetetramine and isophoronediamine; imidazole derivatives; dicyandiamide; tetramethylguanidine; carboxylic acid anhydrides such as methylhexahydrophthalate anhydride; carboxylic acid anhydrides such as adipic acid anhydride; carboxylic amides; monofunctional phenols; polyfunctional phenols such as bisphenol A; polyphenols; polymercaptans; carboxylate salts; and Lewis acid-base complexes such as boron trifluoride ethylamine complex. Among them, one of, or a mixture of two or more of aromatic amines, sulfonate esters, monofunctional phenols, polyfunctional phenols such as bisphenol A and polyphenols are preferable.

The curing agent (C) such as exemplified above is reacted with the compound (A) which is a benzoxazine and the epoxy resin (B), and then a resin composition or fiber-reinforced composite material excellent in heat resistance and moisture resistance can be obtained.

The curing agent (C) is contained preferably 5 to 30 parts by mass, and more preferably 7 to 25 parts by mass per 100 parts by mass of the sum of the compound (A) and the epoxy resin (B). When it is less than 5 parts by mass, the extent of cure of the resin composition as a whole may be insufficient because curing reaction is difficult to progress; when it is over 30 parts by mass, mechanical properties such as glass transition temperature of the cured product may deteriorate.

The toughness enhancing agent (D) is categorized in to an agent to be dispersed as organic or inorganic fine particles in a resin composition and an agent to be dissolved as a liquid resin or a resin monomer in a resin composition. Some of the dispersing-type agents, however, are partially dissolved in a resin composition, and in turn, some of the dissolving-type agents partially remain undissolved as fine particles due to polymerization or other reasons. Both types can be used.

For example, reactive elastomers, Hycar CTBN-modified epoxy resins, Hycar CTB-modified epoxy resins, urethane-modified epoxy resins, nitrile rubber-added epoxy resins, cross-linked acrylic rubber fine particle-added epoxy resins, silicone-modified epoxy resins and thermoplastic elastomer-added epoxy resins can be used.

As the inorganic fine particle fillers, mica, alumina, talc, silica fine particles, Wollastonite, Sepiolite, basic magnesium sulfate, calcium carboxylate, polytetrafluoroethylene powder, zinc powder and aluminum powder can be used.

As the organic fine particles, thermosetting resin fine particles, thermoplastic resin fine particles and a mixture of them can be used.

Examples of the thermosetting resin fine particles include epoxy resin fine particles, phenol resin fine particles, melamine resin fine particles, urea resin fine particles, silicone resin fine particles, urethane resin fine particles and mixtures of these.

Examples of the thermoplastic resin fine particles include copolyester resin fine particles, polyimide resin fine particles, polyamide resin fine particles, acrylic fine particles, butadiene-acrylonitrile resin fine particles, styrene fine particles, olefin fine particles, nylon fine particles, butadiene-alkyl methacrylate-styrene copolymer, acrylate-methacrylate copolymer and mixtures of these. Among them, acrylic fine particles are preferably used because acrylic fine particles have good dispersibility in an epoxy resin.

Examples of methods for producing acrylic fine particles include (1) polymerization of monomer, (2) chemical treatment of polymer and (3) mechanical pulverization of polymer. However, the method (3) is not preferable because this method produces not-so-fine particles with irregular shapes.

Examples of the polymerization include emulsion polymerization, soap-free emulsion polymerization, dispersion polymerization, seed polymerization, suspension polymerization and combinations of these. Emulsion polymerization and seed polymerization are used because these methods provide fine particles with a partially cross-linked structure, core-shell structure, hollow structure or polar structure (such as epoxy group, carboxyl group and hydroxyl group). Partially cross-linked fine particles and core-shell fine particles obtained by these methods are preferably used.

Examples of commercially available products of the core-shell fine particles include Staphyloid AC3355 (trade name; manufactured by Ganz Chemical Co., Ltd.) and MX120 (trade name; manufactured by Kaneka Corporation).

The toughness enhancing agent (D) is contained preferably 1 to 30 parts by mass, and more preferably 3 to 20 parts by mass per 100 parts by mass of the compound (A) which is a benzoxazine resin.

The benzoxazine resin composition may further contain a nanocarbon(s), a fire retardant(s) and/or a release agent(s) to the extent that physical properties of the composition are not affected.

Examples of the nanocarbons include carbon nanotubes, fullerenes and their derivatives.

Examples of the fire retardants include red phosphorous; phosphates such as triphenyl phosphate, tricresyl phosphate, trixylenyl phosphate, cresyldiphenyl phosphate, xylenyldiphenyl phosphate, resorcinol bis(phenyl phosphate) and bisphenol A bis(diphenyl phosphate); and borate esters.

Examples of the release agents include silicone oil, stearate esters and carnauba wax.

The benzoxazine resin composition may be kneaded by any method. For example, a kneader, a planetary mixer or a twin screw extruder may be used. When particles such as a fire retardant and an inorganic filler, it is preferable to disperse in advance the particles in a liquid resin component to be contained in the benzoxazine resin composition using a homomixer, a triple roll mill, a ball mill, a bead mill or ultrasonic in terms of dispersibility of the particles. In mixing with a matrix resin, preliminary dispersing particles and the like, heating, cooling, pressurization and/or depressurization may be conducted as needed. In terms of storage stability, it is preferably to put and store a kneaded product in a refrigerator or a freezer soon after the kneading.

The viscosity of the benzoxazine resin composition at 50° C. is preferably 10 to 3000 Pa·s, more preferably 10 to 2500 Pa·s and most preferably 100 to 2000 Pa·s in terms of tackiness and drapeability. If the viscosity is lower than 10 Pa·s, the tackiness may greatly change with time due to sink of the composition of the present invention; if the viscosity is over 3000 Pa·s, the tackiness and drapeability may decrease.

Preferable examples of the reinforcing fiber include glass fibers, carbon fibers, graphite fibers, aramid fibers, boron fibers, alumina fibers and silicon-carbide fibers. Two or more of these fibers can be used in combination, but it is preferable to used carbon fibers or graphite fibers for obtaining a shaped product that are lighter and more durable. Various carbon and graphite fibers are employable according to purposes. To obtain a composite material that is excellent in shock resistance and has high stiffness and mechanical strength, the tensile modulus of a fiber to be used is preferably 150 to 650 GPa, more preferably 200 to 550 GPa, and further more preferably 230 to 500 GPa, which tensile modulus is obtained from the strand tensile test. The strand tensile test is conducted according to JISR7601 (1986) that follows impregnation of a bundle fiber with the resin having a composition described later and subsequent curing at 130° C. for 35 minutes.

The shape of the reinforcing fiber is not particularly limited. For example, long fibers aligned in a single direction, tows, fabrics, mats, knits, braids, chopped short fibers with a length of less than 10 mm are employable. Long fibers are 10 mm or more continuous single fibers or fiber bundles. Short fibers are less than 10 mm-long chopped fiber bundles. For uses requiring high specific strength and specific modulus, it is most suitable to align fiber bundles in a single direction. For the present invention, alignments like clothes (fabrics) are also suitable.

A method for producing the fiber-reinforced resin composite material 1 will now be described.

First, the prepreg material 4, which constitutes the outer panel 2, and the reinforcing portion 3 are prepared.

The prepreg material 4 is formed by impregnating a reinforcing fiber with the above-described benzoxazine resin composition. Examples of methods for the impregnation include wet methods in which the benzoxazine resin composition is dissolved in a solvent such as methylethyl ketone and methanol for lowering its viscosity and then subjected to the impregnation; and hot melt methods (dry methods) in which the resin composition is heated for lowering the viscosity.

In wet methods, a reinforcing fiber is impregnated in a solution of the benzoxazine resin composition, and then the fiber is then raised from the solution. Thereafter, the solvent is vaporized using an oven or the like. On the other hand, in hot melt methods, a reinforcing fiber is directly impregnated with the benzoxazine resin composition having viscosity lowered by heating; otherwise, a film composed of a release paper or the like coated with the benzoxazine resin composition is prepared, and then the film is laminated on one or both sides of a reinforcing fiber, followed by heating and pressurizing the fiber to impregnate the reinforcing fiber with the resin.

Hot melt methods are preferable because substantially no solvent remains in a prepreg.

The content of the reinforcing fiber in the prepreg material 4 per unit area is preferably 70 to 3000 g/m$^2$. When the content of the reinforcing fiber is less than 70 g/m², production processes may be complicated because many sheets need to be laminated to obtain a certain thickness for obtaining the fiber-reinforced composite material. On the other hand, the content of the reinforcing fiber is over 3000 g/m², drapeability of a prepreg may deteriorated. However, in the case where the prepreg material 4 has a flat or simple curve surface, the content of the reinforcing fiber can be over 3000 g/m².

As to the weight content of the fiber, the weight content of the reinforcing fiber is preferably 30 to 90% by mass, more preferably 35 to 85% by mass, and further more preferably 40 to 80% by mass. When the weight content of the fiber is less than 30% by mass, the content of the resin is too large, and thus advantages of the fiber-reinforced composite material that is excellent in the specific strength and the specific modulus may not be provided, and/or calorific value in curing in forming the fiber-reinforced composite material may be too high. When the weight content of the fiber is over 90% by mass, insufficient impregnation of resin may be caused, and thus the obtained composite material may have too many voids.

After completing preparation of the prepreg material 4, then an outer panel-forming (simple-shape portion-forming) is conducted. In the outer panel-forming, the outer panel 2 is formed by laminating sheets of the prepreg material 4. In the laminating, heating and pressurization may be conducted to strengthen the adhesion of the laminated sheets. The laminated sheets may be shaped by pressure molding, hot drape mold or vacuum bagging, before or after the laminated sheets are put in a mold.

Figure 2:
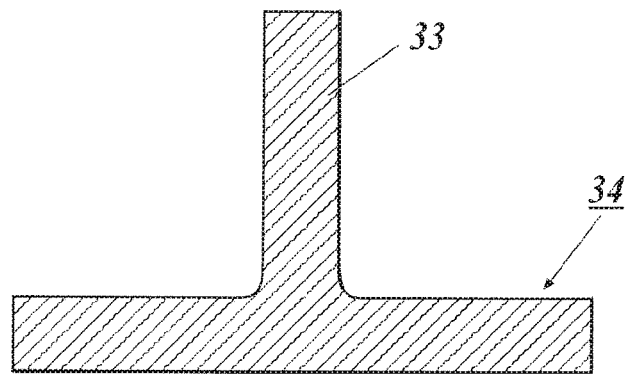
FIG. 2 This is an explanatory diagram illustrating steps for forming a reinforcing portion of the fiber-reinforced composite material illustrated in FIG. 1.

Thereafter, a preform 34 is formed using the reinforcing fiber 33 so as to be in the shape of the reinforcing portion 3, as illustrated in FIG. 2. In the forming the preform, a thermoplastic agent (preferably, it has the composition same as that of the resin) or the like may be used to conduct thermal fusion for keeping the shape. Three-dimensional fabrics may also be used.

Figure 3:
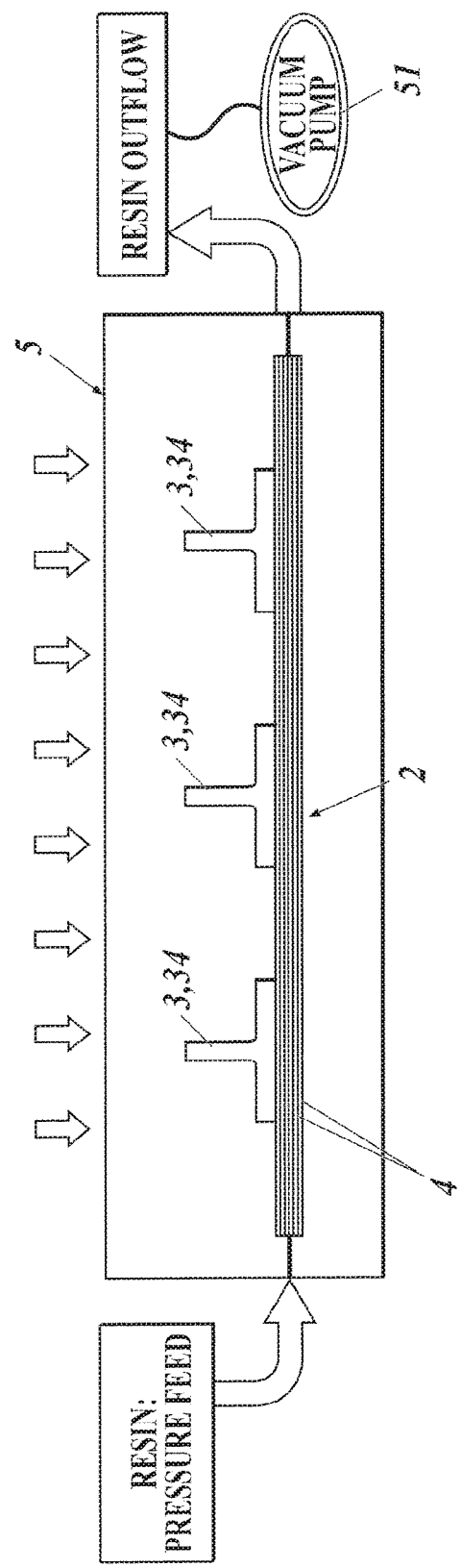
FIG. 3 This is an explanatory diagram illustrating the conditions for a step of integrating the reinforcing portion as one of steps for forming the fiber-reinforced composite material illustrated in FIG. 1.

After completing the forming the preform, reinforcing portion-integrating (complex-shape portion-integrating) is then conducted. In the reinforcing portion-integrating, the preform 34 is formed integrally with the outer panel 2 by matched die molding using male and female molds. FIG. 3 is an explanatory diagram illustrating conditions of the reinforcing portion-integrating. As illustrated in FIG. 3, the outer panel 2 and the preform 34 are placed and set in a mold 5 that is used for forming the fiber-reinforced resin composite material 1, and then a resin is fed by pressure feed. The pressure-fed resin is preferably the above-described benzoxazine resin composition. This pressure-fed resin is then flowed out of the mold 5 by a vacuum pump 51. As a consequence of heating and pressurizing the mold 5, a benzoxazine resin composition 41 that is pressure-fed to the outer panel 2 and the preform 34 is cured to form the reinforcing portion 3 and also integrate the reinforcing portion 3 with the outer panel 2.

According to the present embodiment, as described above, the resin that forms the outer panel 2 and the resin that forms the reinforcing portion 3 are composed of the same components (i.e., the benzoxazine resin composition). Thus, their joint face is not a phase boundary, and the decrease in the strength can be suppressed.

If the component(s) of a resin forming the outer panel 2 differ from the component(s) of a resin forming the reinforcing portion 3 and these resins are compatible with each other, no phase boundary can consequently be observed, and thus it cannot be clear how these resins are contained in their compatible blend portion, resulted in difficulties in designing. In, addition, because these resins are composed of different components, each of the resins has coefficient of linear expansion different from the other(s), and thus the fiber-reinforced resin composite material 1 may curve after these resins cured are removed from a mold.

On the contrary, when the resin that forms the outer panel 2 and the resin that forms the reinforcing portion 3 are composed of the same components, it is able to specify what and how resins are contained in their blend portion, and there is no difference in coefficient of linear expansion. The above problems can therefore be solved. Further, when the resin that forms the outer panel 2 and the resin that forms the reinforcing portion 3 are composed of the same components, it is able to obtain the same design allowable values for the outer panel 2 and the reinforcing portion 3.

In the present invention, the above embodiments may be changed appropriately as needed.

For example, although a matched die molding is described as an example for the step of reinforcing portion integration in the above embodiments, other methods that can integrate the outer panel 2 with the reinforcing portion 3 may be used. Examples of such methods other than a matched die molding include Vacuum-assisted Resin Transfer Molding (VaRTM). Matched die molding does not require subsidiary goods that are necessary for Vacuum-assisted Resin Transfer Molding such as a vacuum pack, and thus can reduce costs of subsidiary goods and costs of disposing such goods. A matched die molding is also excellent in dimensional accuracy compared to Vacuum-assisted Resin Transfer Molding.

In the above embodiments, the outer panel 2 given as an example is formed of sheets of the prepreg material 4, but alternatively, the outer panel 2 may be formed of one sheet of the prepreg material 4.

In the above embodiments, the complex-shape portion is exemplified by the reinforcing portion 3 such as a longeron, but alternatively, the complex-shape portion may be other portions that require joint strength to the simple-shape portion such as a bracket.

EXAMPLE

The present invention will now be described in detail with reference to Example, but the present invention is not limited thereto.

Example

The prepreg material 4 is a 0.14 mm-thick, 420 mm-width and 21 mm-depth sheet formed of a benzoxazine resin composition (NF-34 (trade name), manufactured by JX Nippon Oil & Energy Corporation). The prepreg material 4 contains a reinforcing fiber that is carbon fiber (T700G (trade name), manufactured by TORAY INDUSTRIES, INC.) and has a FAW (Fiber Areal Weight) of 150 g/m² and an RC of 25 wt %. The outer panel 2 is formed of 16 sheets of the prepreg material 4, the sheets being laminated by integral molding so that the direction of the carbon fiber in one sheet differs by 45° compared to that of the carbon fiber in the next sheet. The thickness of the thus-formed outer panel is 2.24 mm.

The reinforcing portion 3 used herein is not in the above-described shape but is a sheet to simplify experiments in this Example. A base of the reinforcing portion 3 is a 0.68 mm-thick, 420 mm-wide and 210 mm-deep sheet of a four-layer NCF (Non Crimp Fabrics). This four-layer NFC contains a reinforcing fiber that is carbon fiber (T700G (trade name), manufactured by TORAY INDUSTRIES, INC.) and has a FAW of 692 g/m² (173 g/m² per sheet). Three sheets of this four-layer NFC are laminated on the prepreg material 4, and then the resulting product is put and set in a mold. Subsequently, the benzoxazine resin composition (NF-34 (trade name), manufactured by JX Nippon Oil & Energy Corporation) is fed by pressure feed into the mold. After the outflow, hot-press molding is conducted as monolithic integration. The fiber-reinforced resin composite material 1 is thus formed as Example.

Comparative Example 1

Comparative Example 1 is formed by the same way as Example is formed except that the prepreg material 4 is formed of an epoxy resin (Y24S31R150 (product number), manufactured by JX Nippon Oil & Energy Corporation) and the reinforcing portion 3 is formed of an epoxy resin (EPOLAM5015 (trade name), manufactured by AXSON).

Comparative Example 2

Comparative Example 2 is formed by the same way as Comparative Example 1 is formed except that the reinforcing portion 3 is formed of an epoxy resin (PR520 (trade name), manufactured by Cvtec).

[Comparison]

Example, Comparative Examples 1 and 2 were subjected to an interlaminar shear strength test by a method according to ASTM D2344, and further, subjected to a four-point flexural strength test by a method according to ASTM D6272.

In addition, outer panels 2 were each formed by integral molding through laminating 32 sheets of the prepreg material 4 of Example, Comparative Examples 1 or 2 so that the direction of the carbon fiber in one sheet differs by 45° compared to that of the carbon fiber in the next sheet. These outer panels were also subjected to an interlaminar shear strength test and a four-point flexural strength by the above methods.

[Result of Comparison]

TABLE 1

| | | EXAMPLE | COMPARATIVE EXAMPLE 1 | COMPARATIVE EXAMPLE 2 |
|---|---|---|---|---|
| INTERLAMINAR SHEAR STRENGTH (Mpa) | OUTER PANEL ONLY | 47.5 | 45.1 | 45.1 |
| | WHOLE | 72.0 | 54.9 | 41.7 |
| FOUR-POINT FLEXURAL STRENGTH (Mpa) | OUTER PANEL ONLY | 514 | 602 | 602 |
| | WHOLE | 674 | 574 | 303 |

Figure 4:
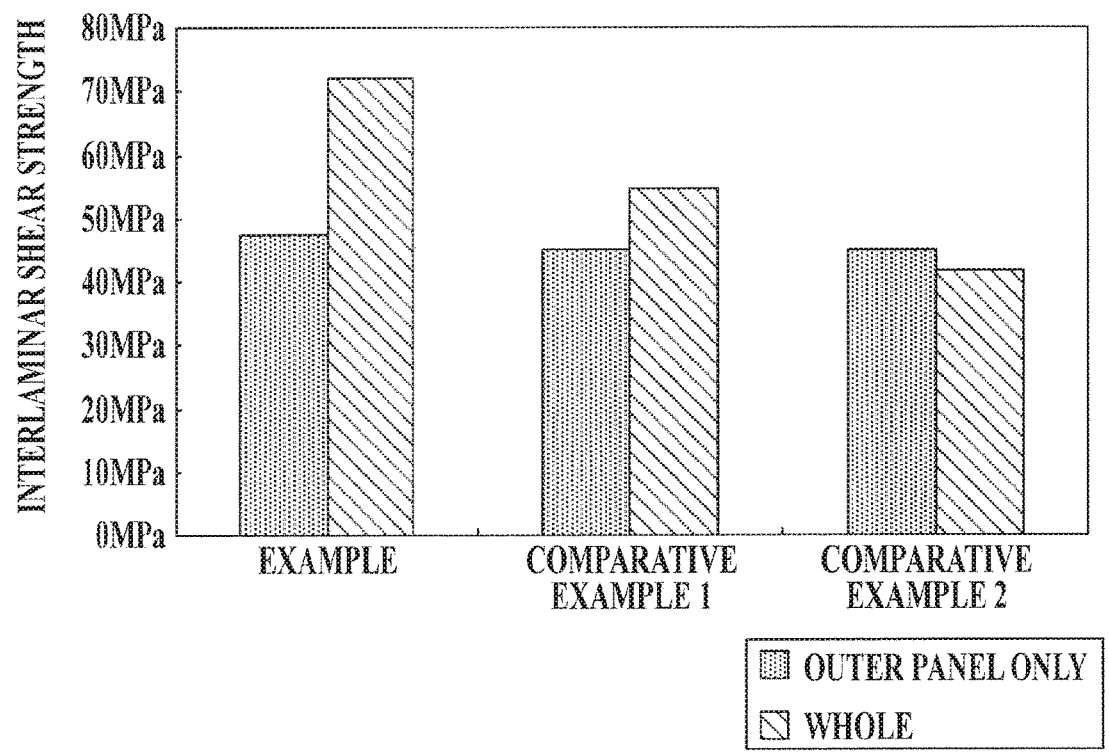
FIG. 4 This is a graph showing interlaminar shear strengths of Example and Comparative Examples FIG. 5 This is a graph showing four-point flexural strengths of Example and Comparative Examples
Figure 5:
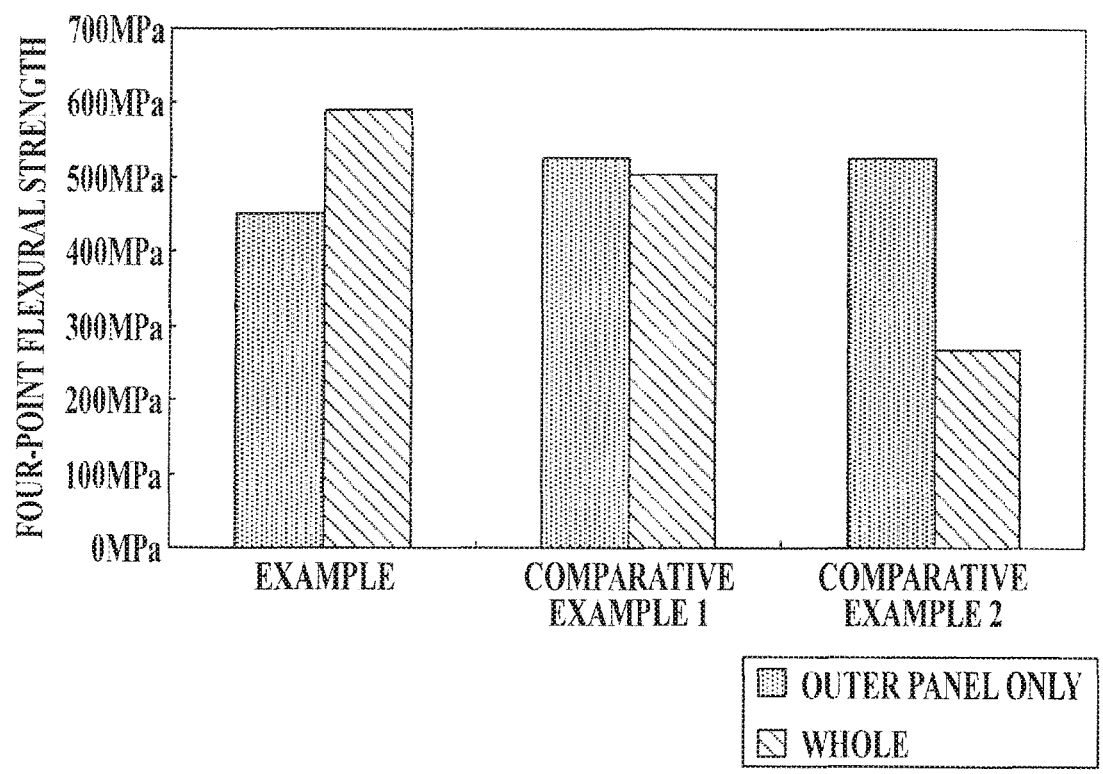

Results of the comparison are shown in Table 1 and FIGS. 4 and 5.

In the comparison of the outer panels 2 only, interlaminar shear strength and four-point flexural strength of Example are not so different from Comparative Examples 1 and 2. However, in the comparison of the fiber-reinforced resin composite materials 1 as a whole, interlaminar shear strength and four-point flexural strength of Example are remarkably improved compared to Comparative Examples 1 and 2.

DESCRIPTION OF REFERENCE NUMERALS

1 Fiber-reinforced resin composite material
2 Outer panel (Simple-shape portion)
3 Reinforcing portion (Complex-shape portion)
4 Prepreg material
5 Mold
6 Mold
31 Base portion
32 Rib
33 Reinforcing fiber
34 Preform
51 Vacuum pump
61 Benzoxazine resin composition

The invention claimed is:

1. A method for producing a fiber-reinforced resin composite material, comprising:
    forming a first member from at least one sheet of a flat or a simple curved prepreg material formed of a reinforcing fiber impregnated with a first resin;
    forming a second member as a preform of reinforcing fibers;
    placing the first member and the second member in a mold, wherein the preform is arranged on a side of the first member where reinforcement is needed;
    feeding a second resin into the mold; and
    heating and pressurizing the mold to impregnate the second resin into the reinforcing fibers of the preform and to integrate the first member and the second member,
    wherein
    the first resin used in the first member and the second resin used in the second member are a benzoxazine resin.

2. The method for producing the fiber-reinforced resin composite material of claim 1, wherein
    the benzoxazine resin comprises a compound containing in its molecule a benzoxazine ring represented by a formula (1), an epoxy resin, a curing agent and a toughness enhancing agent:

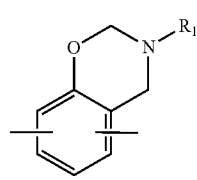

(1)

wherein $R_1$ represents a chain alkyl group of 1 to 12 carbons, a ring alkyl group of 3 to 8 carbons, a phenyl group or a phenyl group substituted with a chain alkyl group of 1 to 12 carbons or a halogen; and a hydrogen atom is bonded to at least one of carbon atoms of the aromatic ring at an ortho position and a para position relative to the carbon atom that bonds the oxygen atom in the formula.

3. The method for producing the fiber-reinforced resin composite material of claim 1, wherein
a viscosity of the benzoxazine resin composition at 50° C. is 10 to 3000 Pa·s.

4. A method for producing a fiber-reinforced resin composite material, comprising:
forming a first member from at least one sheet of a flat or a simple curved prepreg material formed of a reinforcing fiber impregnated with a first resin;
forming a second member as a preform of reinforcing fibers;
placing the first member and the second member in a mold, wherein the preform is arranged on a side of the first member where reinforcement is needed;
feeding a second resin into the mold; and
heating and pressurizing the mold to impregnate the second resin into the reinforcing fibers of the preform and to integrate the first member and the second member,
wherein the first resin used in the first member and the second resin used in the second member are a benzoxazine resin, and
wherein a content of the reinforcing fiber in the prepreg material of the first member is 70 to 3000 g/m².

5. A method for producing a fiber-reinforced resin composite material, comprising:
forming a first member from at least one sheet of a flat or a simple curved prepreg material formed of a reinforcing fiber impregnated with a first resin;
forming a second member as a preform of reinforcing fibers;
placing the first member and the second member in a mold, wherein the preform is arranged on a side of the first member where reinforcement is needed;
feeding a second resin into the mold; and
heating and pressurizing the mold to impregnate the second resin into the reinforcing fibers of the preform and to integrate the first member and the second member,
wherein the first resin used in the first member and the second resin used in the second member are a benzoxazine resin, and
wherein a content of the reinforcing fiber in the prepreg material of the first member is 30% to 90% by mass.

* * * * *